(12) United States Patent
Cooper

(10) Patent No.: US 7,962,135 B2
(45) Date of Patent: Jun. 14, 2011

(54) METHOD AND APPARATUS FOR EFFICIENT SELECTION AND ACQUISITION OF A WIRELESS COMMUNICATIONS SYSTEM

(75) Inventor: Rotem Cooper, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 754 days.

(21) Appl. No.: 10/043,695

(22) Filed: Jan. 10, 2002

(65) Prior Publication Data
US 2003/0129979 A1     Jul. 10, 2003

(51) Int. Cl.
*H04W 4/00* (2009.01)
(52) U.S. Cl. ............... 455/432.1; 455/433; 455/450
(58) Field of Classification Search ........... 455/432.1, 455/432.3, 435.1, 435.2, 450, 525, 432.2, 455/434, 456.3, 459, 419, 426.1, 515, 461, 455/435.3
See application file for complete search history.

(56) References Cited

U.S. PATENT DOCUMENTS

| | | | |
|---|---|---|---|
| 5,109,390 A | 4/1992 | Gilhousen et al. | |
| 5,442,806 A * | 8/1995 | Barber et al. | 455/435.2 |
| 5,734,980 A | 3/1998 | Hooper et al. | |
| 5,915,214 A * | 6/1999 | Reece et al. | 455/406 |
| 5,999,816 A | 12/1999 | Tiedemann, Jr. et al. | 455/437 |
| 6,085,085 A | 7/2000 | Blakeney, II et al. | |
| 6,195,532 B1 * | 2/2001 | Bamburak et al. | 340/7.42 |
| 6,405,040 B1 * | 6/2002 | Liu et al. | 455/435.3 |
| 6,434,186 B2 * | 8/2002 | Dowling | 375/147 |
| 6,470,182 B1 * | 10/2002 | Nelson | 455/432.1 |
| 6,549,770 B1 * | 4/2003 | Marran | 455/419 |
| 6,564,055 B1 * | 5/2003 | Hronek | 455/433 |
| 6,587,685 B2 * | 7/2003 | Mittal et al. | 455/419 |
| 6,625,132 B1 * | 9/2003 | Boettger et al. | 370/329 |
| 6,625,451 B1 * | 9/2003 | La Medica et al. | 455/434 |
| 6,684,082 B1 * | 1/2004 | McClure | 455/552.1 |
| 6,754,491 B2 * | 6/2004 | Konno et al. | 455/434 |

(Continued)

FOREIGN PATENT DOCUMENTS
EP     0597225     9/1993

(Continued)

OTHER PUBLICATIONS
International Search Report—PCT/US2003/000697—International Search Authority, European Patent Office, May 27, 2003.

*Primary Examiner* — George Eng
*Assistant Examiner* — Khawar Iqbal
(74) *Attorney, Agent, or Firm* — Stanton Braden

(57) ABSTRACT

A mobile station is adapted to avoid unusable wireless communications systems during system acquisition. The mobile station includes processing circuitry and a memory storing a preferred roaming list and system avoidance data. The system avoidance data identifies unusable systems and includes corresponding avoidance criteria. The processing circuitry is adapted to select a system from the preferred roaming list in accordance with a predetermined system acquisition procedure. The selected system is skipped if corresponding avoidance criteria is satisfied. If the selected system is usable, the mobile station may attempt to acquire and register with the selected system. The processing circuitry is further adapted to add systems to the system avoidance data in response to a communications failure, and remove systems from the system avoidance data when corresponding avoidance criteria is no longer satisfied. The avoidance criteria may include a time period during which the corresponding system is unusable.

23 Claims, 4 Drawing Sheets

U.S. PATENT DOCUMENTS

| | | | |
|---|---|---|---|
| 6,766,167 B2 * | 7/2004 | Tung et al. | 455/432.1 |
| 6,766,169 B2 * | 7/2004 | Cooper | 455/435.2 |
| 6,801,762 B1 * | 10/2004 | Huilgol | 455/404.1 |
| 2002/0102973 A1 * | 8/2002 | Rosenberg | 455/432 |
| 2002/0168976 A1 * | 11/2002 | Krishnan | 455/432 |
| 2002/0187804 A1 * | 12/2002 | Narasimha et al. | 455/552 |
| 2003/0087642 A1 * | 5/2003 | Mazzara | 455/450 |

FOREIGN PATENT DOCUMENTS

| | | | |
|---|---|---|---|
| EP | 0862346 | | 3/1998 |
| JP | 11-103486 | | 4/1999 |
| KR | 699734 | | 3/2007 |
| WO | 9736443 | | 10/1997 |
| WO | 0027158 | | 5/2000 |
| WO | WO0101666 | * | 1/2001 |

* cited by examiner

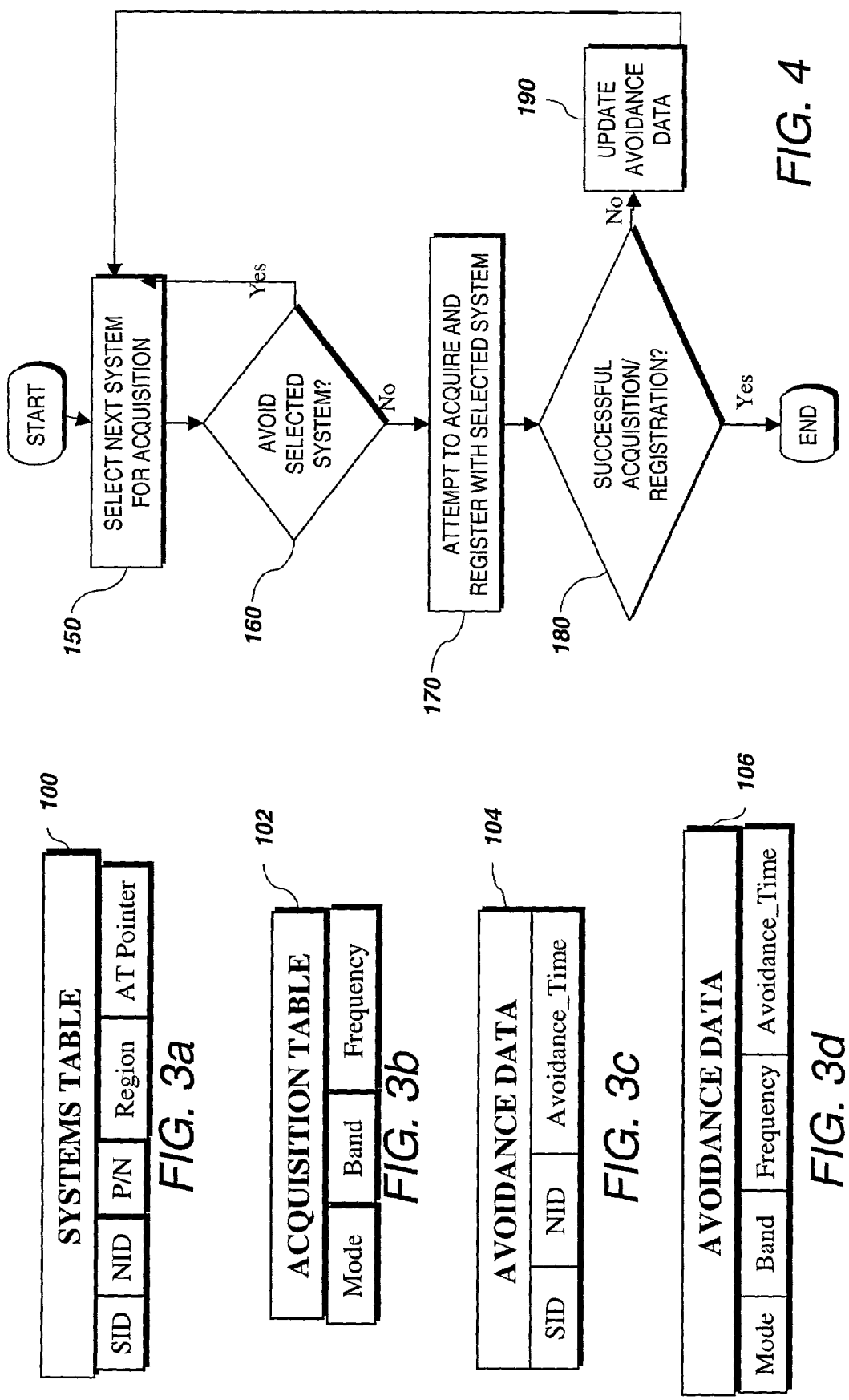

| ACQUISITION/REGISTRATION FAILURE | AVOIDANCE_DURATION |
|---|---|
| Unable to Acquire Pilot Signal | 30 seconds |
| Unable to Acquire Synchronization Channel | 30 seconds |
| Unable to Acquire Paging Channel | 30 seconds |
| Registration Rejected By Wireless Communications System | 2 minutes |
| Mobile Station Has Experienced Frequent Signal Fading | 2 minute |
| Protocol Mismatch | 5 minute |
| Invalid Redirection | 1 minute |

FIG. 5

METHOD AND APPARATUS FOR EFFICIENT SELECTION AND ACQUISITION OF A WIRELESS COMMUNICATIONS SYSTEM

BACKGROUND OF THE INVENTION

1. Field of the Invention

The present invention relates generally to wireless communications and, in particular, to a method and apparatus for efficiently selecting and acquiring a preferred wireless communications system.

2. Description of the Related Art

A mobile device will often have access to more than one wireless communications system in its geographic region. The quality of the wireless services available to the mobile device may vary from system to system depending on the equipment used by each system, the features of the mobile device, the distance between the mobile device and local base stations, physical obstructions such as buildings and hills, and the volume of communications traffic on each system. The wireless communications systems may also support different multiple-access wireless communications protocols such as code division multiple access (CDMA), wideband CDMA (WCDMA), Advanced Mobile Phone Service (AMPS), Global System for Mobile communications (GSM), General Packet Radio Services (GPRS) or High Data Rate (HDR) technology (e.g., 1xEV technology). In addition, the fees charged to a user of the mobile device may vary depending on the time of day, the duration of the connection with the wireless communications system and whether the mobile device is listed as a subscriber of the wireless communications system.

To assist with the selection of a desirable wireless communications system, conventional mobile devices store data describing known systems in a preferred roaming list (PRL). The PRL typically includes a systems table which stores a system identifier (SID) and a network identifier (NID) for each known wireless communications system, and an acquisition table which stores acquisition parameters including band, frequency and mode, for the known wireless communications systems. Within the systems table, the wireless communications systems may be grouped by geographic region and sorted from the most desirable to the least desirable system in each region. The most desirable system in a particular geographic region is typically a subscriber system, but may also be a roaming system that offers the mobile device a favorable combination of low cost and high quality of service. Roaming systems offer wireless services to non-subscriber mobile devices, usually at a much higher fee than subscription services, and may be desirable when the mobile device enters a geographic region that is outside the coverage area of the mobile device's subscription service, when the subscription services are blocked or otherwise unavailable, or when the subscription services are only available at an unacceptably low level of quality.

During a mobile device's power-up sequence, attempts are made to acquire and register with the most desirable wireless communications system that is available to the mobile device in its current geographic region. In one approach, the mobile device identifies its current geographic region and then steps through the entries in the systems table, from the most desirable system in the identified geographic region to the least desirable system in the identified geographic region, until a system acquisition and registration attempt is successful. The mobile device may also attempt to acquire and register with a new wireless communications system during operation. For example, the connection between the mobile device and a current wireless communications system may be lost, requiring the acquisition of a new system by the mobile device. In addition, the wireless communications systems that are available to the mobile device may change as the position of the mobile device and its surrounding environment changes. To provide the user of the mobile device with the best combination of high quality and low cost, many mobile devices periodically attempt to acquire and register with a wireless communications system that is more desirable than the current wireless communications system used by the mobile device. The mobile device typically searches the systems table for wireless communications systems in its geographic region that are more desirable than the current system used by the mobile device. If more desirable systems are found in the systems table, the mobile device will switch away from the current communications channel and attempt to acquire and register with one of the more desirable systems.

A system acquisition sequence, such as the system acquisition sequences described above, will often include a series of failed attempts to acquire a signal and register with the corresponding wireless communications system, followed by a single successful system acquisition and registration. These failed registration/acquisition attempts are common, time consuming (e.g., each failed attempt may take up to 20 seconds) and may be caused by a variety of factors. For example, the mobile device may be unable to detect a pilot signal transmitted from a system base station if the pilot signal is blocked or weakened by physical obstructions, or if the mobile device is outside the base station's coverage area. Registration with the system may fail if the mobile device and the system use incompatible protocol revisions and hardware, or if system otherwise rejects the registration attempt of the mobile device.

In view of the above, there is a need in the art for a method and apparatus for efficiently selecting and acquiring a wireless communications system.

SUMMARY OF THE INVENTION

The present invention is a method and apparatus for efficiently selecting and acquiring a wireless communications system. In a preferred embodiment, a mobile station is adapted to avoid unusable wireless communications systems during system acquisition. The mobile station includes processing circuitry and a memory storing a preferred roaming list and system avoidance data. The system avoidance data identifies unusable systems and includes corresponding avoidance criteria. The processing circuitry is preferably adapted to select a system from the preferred roaming list in accordance with a predetermined system acquisition procedure. The selected system is skipped if corresponding avoidance criteria is satisfied. If the selected system is usable, the mobile station may attempt to acquire and register with the selected system. The processing circuitry is further adapted to add systems to the system avoidance data in response to a communications failure, and remove systems from the system avoidance data when corresponding avoidance criteria is no longer satisfied.

The mobile station preferably includes processing circuitry, a memory, a communications transceiver and an antenna. The processing circuitry includes a control processor for controlling the operation of the mobile station, a signal processor, a searcher, a system determination unit and a clock. The memory stores a preferred roaming list (PRL) that includes a list of wireless communications systems that are used by the mobile station during attempts to acquire and register with a wireless communications system. The PRL preferably includes a systems table that stores a list of system identifiers and corresponding desirability and geographic information, and an acquisition table that stores a list of acquisition parameters that are necessary for the acquisition of the wireless communications systems listed in the systems table. In a preferred embodiment, the PRL is maintained by an external source, such as the mobile station's wireless service provider.

The processing circuitry is adapted to create and maintain a list of unusable systems that is stored in the memory and includes a plurality of system identifiers and corresponding avoidance criterion. Each system identifier identifies one or more wireless communications systems and may include a SID/NID combination, a frequency or other identifier. A wireless communications system is considered unusable if it is identified by a system identifier in the list of unusable systems and the corresponding avoidance criterion is satisfied. The processing circuitry is also adapted to detect a communications failure with a currently selected wireless communications system and add a record to the list of unusable systems including an identifier of the failed system and corresponding avoidance criterion that is based on the detected communications failure.

In a preferred embodiment, the avoidance criterion includes an avoidance time that is equal to a current time plus an avoidance duration. The avoidance duration may be found in a lookup table that includes an entry for each of a plurality of communications failures and corresponding avoidance durations. When a system acquisition/registration attempt fails, the mobile station identifies the cause of the failure and locates the corresponding avoidance duration in the lookup table. The corresponding avoidance duration is then added to a current time to produce an avoidance time for the failed system. The avoidance time identifies a time period during which the corresponding wireless communications system is unusable. After the avoidance time expires, the system becomes usable and may be removed from the list of unusable systems.

In operation, the mobile station attempts to acquire a wireless communications system in accordance with a predetermined system acquisition procedure. As each system is selected from the PRL, the mobile station searches for the selected system in the list of unusable systems and, if found, analyzes the corresponding avoidance criterion to determine whether the selected system is unusable. If the selected system is unusable, it will be avoided by the mobile station and the next system is selected from the PRL in accordance with the predetermined system acquisition procedure. If a usable system is selected, an attempt is made to acquire the signal and register with the selected system. After a successful system acquisition/registration, the mobile station may use the system for future wireless communications services. If the acquisition/registration attempt is unsuccessful, then the selected wireless communications system is added to the list of unusable systems along with corresponding avoidance criterion.

A more complete understanding of the Method and Apparatus for Efficient Selection and Acquisition of a Wireless Communications Systems will be afforded to those skilled in the art, as well as a realization of additional advantages and objects thereof, by a consideration of the following detailed description of preferred embodiments. Reference will be made to the appended sheets of drawings, which will first be described briefly.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein:

FIG. 3a is a systems table in accordance with a preferred embodiment of the present invention;

FIG. 3b is an acquisition table in accordance with a preferred embodiment of the present invention;

FIG. 3c is an avoidance data table in accordance with a preferred embodiment of the present invention;

FIG. 3d illustrates an alternative embodiment of an avoidance data table;

FIG. 4 is a flow diagram illustrating a preferred system acquisition procedure; and FIG. 5 illustrates an avoidance duration lookup table in accordance with a preferred embodiment of the present invention.

DETAILED DESCRIPTION OF A PREFERRED EMBODIMENT

Figure 1:
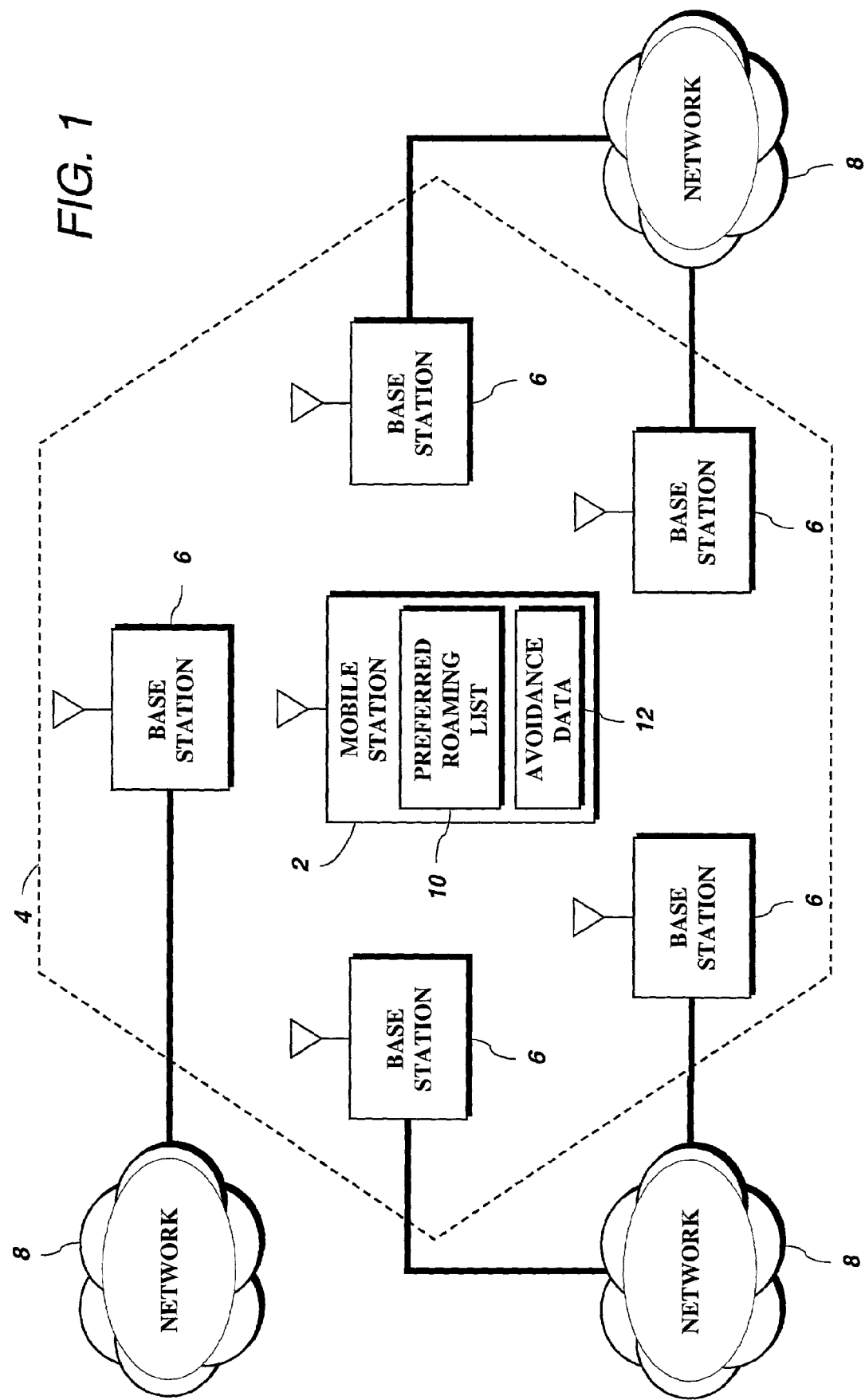
FIG. 1 illustrates a preferred embodiment of the present invention.

A preferred embodiment of the present invention is illustrated in FIGS. 1-5. Referring to FIG. 1, a mobile station 2 operates in a geographic region 4 that is serviced by at least one base station 6. Each base station 6 is connected to a network 8, which is part of a larger wireless communications system that supports at least one multiple-access wireless communications protocol, such as code division multiple access (CDMA), wideband CDMA (WCDMA), Advanced Mobile Phone Service (AMPS), Global System for Mobile communications (GSM), General Packet Radio Services (GPRS) or High Data Rate (HDR) technology (e.g., 1xEV technology). The mobile station 2 may be any wireless device, whether stationary or mobile, that is adapted for wireless communications with at least one base station 6, such as a cellular telephone, pager, personal digital assistant (PDA), vehicle navigation system or portable computer.

The mobile station 2 preferably includes a preferred roaming list (PRL) 10 and system avoidance data 12. The PRL 10 is stored in a nonvolatile memory of the mobile station 2 and includes a list of wireless communications systems and corresponding acquisition parameters that are used by the mobile station 2 during attempts to acquire and register with a wireless communications system. In a preferred embodiment, the PRL 10 is updated by the mobile station's wireless service provider and includes a list of wireless communications systems that are available to the mobile station 2 through its wireless service provider or other wireless service providers that have agreed to provide roaming services to the mobile station 2. The system avoidance data 12 is maintained by the mobile station 2 and includes a list of wireless communications systems and corresponding avoidance criterion. In a preferred embodiment, each wireless communications system listed in the avoidance data 12 is unusable and will be avoided by the mobile station 2 as long as the corresponding avoidance criterion is satisfied.

In operation, the mobile station 2 attempts to acquire a wireless communications system in accordance with a predetermined system acquisition procedure. The system acquisition procedure preferably includes selecting wireless communications systems in an order of desirability in the mobile station's current geographic region 4 from the PRL 10. As each system is selected, the mobile station 2 searches for the selected system in the avoidance data 12 and, if found, analyzes the corresponding avoidance criterion to determine whether the selected system is unusable. If the selected system is unusable, it will be avoided by the mobile station 2 and the next system is selected from the PRL 10 in accordance with the system acquisition procedure. If a usable system is selected, an attempt is made to acquire a corresponding signal and register with the selected system. After a successful acquisition/registration, the mobile station 2 may use the selected system for future wireless communications services. If the acquisition/registration attempt is unsuccessful, then the selected wireless communications system is added to the avoidance data 12 along with corresponding avoidance criterion.

Figure 2:
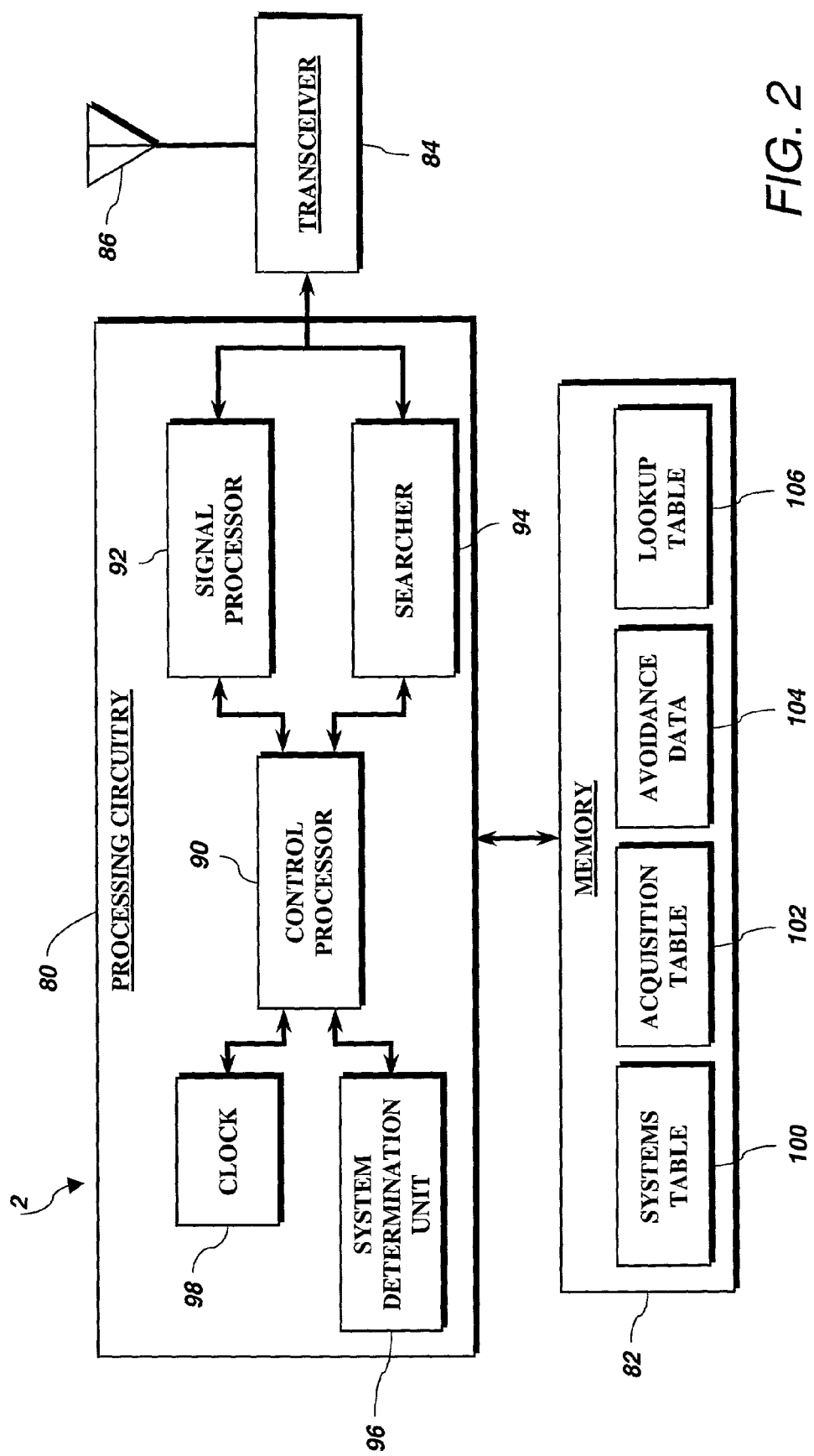
FIG. 2 is a mobile station in accordance with a preferred embodiment of the present invention.

Referring to FIG. 2, a preferred embodiment of the mobile station 2 will now be described. The mobile station 2 includes processing circuitry 80, a memory 82, a communications transceiver 84 and an antenna 86. The processing circuitry 80 preferably includes a control processor 90 for controlling the operation of the mobile station 2, a signal processor 92, a searcher 94, a system determination unit 96 and a clock 98. The memory 82 preferably includes both volatile and nonvolatile random access memories that store a preferred roaming list, including a systems table 100 and an acquisition table 102, and avoidance data 104. The memory 82 may also store one or more lookup tables 106.

The searcher 94 is adapted to identify valid signals, such as pilot signals, synchronization channels and paging channels received by the transceiver 84 through the antenna 86. The design and implementation of searcher hardware for CDMA acquisition is described in U.S. Pat. No. 5,109,390, entitled "DIVERSITY RECEIVER IN A CDMA CELLULAR TELEPHONE SYSTEM," assigned to the assignee of the present invention, and is incorporated herein by reference. The system determination unit 96 is adapted to select one or more wireless communications systems from the systems table 100 and retrieve corresponding acquisition parameters from the acquisition table 102. The system determination unit 96 is further adapted to forward the acquisition parameters to the searcher 94, which attempts to acquire one the selected systems. In an alternative embodiment, the system determination unit 96 determines whether the current wireless communications system is the most desirable system in the mobile device's current geographic region and, when more desirable systems are available, initiates attempts by the mobile station 2 to acquire a more desirable system. A method and apparatus for performing preferred system selection in a mobile station that is capable of operation in a plurality of geographic regions is disclosed in U.S. Pat. No. 6,085,085, entitled "METHOD AND APPARATUS FOR PERFORMING PREFERRED SYSTEM SELECTION," assigned to assignee, and is incorporated herein by reference.

Referring to FIGS. 2 and 3a, a preferred embodiment of the systems table 100 will now be described. The systems table 100 includes a list of wireless communications systems that the mobile station 2 uses during attempts to acquire and register with a wireless communications system. As illustrated, each record in the systems table 100 preferably includes a system identifier (SID), a network identifier (NID), an indication of whether the system is preferred or negative (P/N), an identifier of the geographic region (Region) and a pointer (AT Pointer) to a record in the acquisition table 102. Each wireless communications system listed in the systems table 100 is identified through a unique SID/NID pair and is designated as either a preferred system that may be used by the module device 2 during roaming, or a negative system that should not be used by the mobile device 2 during roaming. In alternative embodiments, the wireless communications systems listed in the systems table 100 may be identified using other system identifiers, such as an Internet Protocol Version 6 (IPV6) address or a Public Land Mobile Network (PLMN) identifier. The wireless communications systems are preferably grouped by geographic region and stored in the systems table 100 in sorted order from the most desirable system to the least desirable system in each region. The desirability of each system may be determined using criteria such as the cost of using the system, the quality of the communications service offered by the system, protocol used by the system, support for unique features and whether the mobile station 2 is a subscriber of the wireless communications system. In alternative embodiments, the systems table 100 may include other information such as a desirability rating (e.g., a numerical score) for each system and acquisition parameters.

Referring to FIG. 3b, a preferred embodiment of the acquisition table 102 will now be described. The acquisition table 102 includes a list of parameters that are necessary for the acquisition of the wireless communications systems listed in the systems table 100. As illustrated, each record in the acquisition table 102 preferably includes a mode, a band and a frequency. It will be appreciated, however, that other system acquisition parameters may be used. The systems table 100 and the acquisition table 102 are preferably stored in a non-volatile memory and updated periodically by an external source, such as the mobile station's wireless service provider, through downloads across a wireless connection or through another data transfer method.

A preferred embodiment of the avoidance data 104 will now be described with reference to FIGS. 2 and 3c. The avoidance data 104 is stored as a table in either a volatile or nonvolatile memory of the mobile station 2. Each entry in the avoidance data 104 includes an identifier of one or more wireless communications systems, such as a unique SID/NID pair or a frequency, and corresponding avoidance criterion, such as an Avoidance_Time. In a preferred embodiment, the Avoidance_Time is the time, as measured by clock 98, after which it is permissible to attempt acquisition of the corresponding wireless communications systems. In a first alternative embodiment, illustrated in FIG. 3d, each entry in an avoidance data table 108 includes a mode, band and frequency to be avoided during future system acquisition attempts, and an Avoidance_Time that defines a time period during which the mode, band and frequency should be avoided. In a second alternative embodiment, the avoidance data may include historical information, such as an identification of the most recent acquisition/registration failure for each wireless communications system.

A preferred system acquisition sequence for the mobile station 2 will now be described with reference to FIG. 2 and the flow diagram of FIG. 4. The illustrated system acquisition sequence is preferably performed by the processing circuitry 80 before an attempt is made to acquire and register with a wireless communications system. In Step 150, the mobile station 2 selects a system from the systems table 100 in accordance with a predetermined system acquisition sequence. In a preferred embodiment, the most desirable system in the mobile station's current geographic region is selected from the preferred roaming list. In Step 160, the mobile station 2 searches for the selected system in the avoidance data 104 and, if found, analyzes the corresponding avoidance criterion to determine whether the selected system is unusable. In a preferred embodiment, the avoidance criterion includes an Avoidance_Time, which is compared to a current time as measured by clock 98. If the Avoidance_Time is greater than the current time then the selected system is unusable and should be avoided, and control returns to Step 150 where the next most desirable system is selected from the preferred roaming list.

If the selected system is not found in the avoidance data 104, or if the selected system is found in the avoidance data 104 and the Avoidance_Time is less than the current time, then the selected system is usable and control passes to Step 170. In a preferred embodiment, the processing circuitry 80 removes usable systems from the avoidance data 104. In Step 170, an attempt is made to acquire and register with the selected system. If the system acquisition/registration attempt is successful (Step 180), the mobile station 2 uses the selected system for future wireless communications services. If the acquisition/registration attempt is unsuccessful then the selected system is added to the avoidance data 104 along with a corresponding Avoidance_Time, in Step 190. The Avoidance_Time is preferably calculated by adding an Avoidance_Duration to a current time as measured by clock 98. After the avoidance data 104 is updated, control returns to Step 150 where the next most desirable system is selected from the preferred roaming list.

In a preferred embodiment, the value of the Avoidance_Duration used to calculate the Avoidance_Time is obtained from a lookup table, such as an avoidance duration lookup table 200 illustrated in FIG. 5. The lookup table 200 includes an entry for each of a plurality of communications failures, such as the identified system acquisition and registration failures listed in entries 202-214, and each entry includes a corresponding Avoidance_Duration. When a system acquisition/registration attempt fails, the mobile station 2 identifies the cause of the failure and locates the corresponding Avoidance_Duration in the lookup table 200. In a preferred embodiment, the cause of the failure is identified by determining the point at which the acquisition/registration procedure failed. The corresponding Avoidance_Duration is then added to a current time to produce an Avoidance_Time for the failed system. In alternative embodiments, the Avoidance_Duration may be a predetermined constant or function that is applied to each new entry in the avoidance data 104.

The avoidance duration lookup table 200 preferably includes a record that corresponds to each system acquisition/registration failure that is detectable by the mobile station 2. For example, an attempt to acquire/register with a selected CDMA system will fail if the mobile station 2 is unable to acquire the system's pilot signal (record 202), synchronization channel (record 204) or paging channel (record 206). Even if the mobile device 2 is able to acquire the necessary signals, registration may be rejected by the selected system (record 208). In addition, attempts to access the selected system may fail due to an access denial, an access time out, maximum access probes transmitted or an unsupported channel assignment. The mobile device 2 may experience frequent signal fading (record 210) or otherwise determine that a received signal quality is inadequate. An acquisition/registration attempt may also fail if the mobile station 2 and the selected system use incompatible protocol revisions and hardware (record 212). Communications failures can also occur after the mobile station 2 acquires and registers with a selected system. For example, the mobile station 2 may receive an invalid redirection message (record 214) on a paging channel.

Having thus described a preferred embodiment of the Method and Apparatus for Efficient Selection and Acquisition of a Wireless Communications System, it should be apparent to those skilled in the art that certain advantages of the within described system have been achieved. It should also be appreciated that various modifications, adaptations, and alternative embodiments thereof may be made within the scope and spirit of the present invention. For example, it is contemplated that the mobile station 2 may override the avoidance data 104 and attempt to acquire an unusable system.

The scope of the present invention is defined by the following claims.

What is claimed:

1. In a mobile station including a preferred roaming list, a method for an efficient selection system for registration/acquisition of wireless communications systems that avoids time consuming acquisition of a signal that takes up to about 20 seconds, comprising:
   a) maintaining a list of unusable wireless communications systems, each entry of a wireless communications system in the list of unusable wireless communications systems including a system identifier and corresponding avoidance criterion that is equal to a current time plus an avoidance duration time from a look-up table that includes an entry for each of a plurality of communications failures and corresponding avoidance durations for not using the wireless communications system, wherein at least one of said unusable wireless communications systems is included on the preferred roaming list;
   b) selecting a wireless communications system from the preferred roaming list of wireless communications systems in accordance with a predetermined system acquisition sequence, each entry of a wireless communications system in the preferred roaming list including a system identifier;
   c) determining whether the selected wireless communications system from the preferred roaming list is a useable wireless communications system or an unusable wireless communications system; by using system avoidance data and corresponding avoidance criteria to identify unusable systems; adding systems to system avoidance data in response to a communications failure, and removing systems from the system avoidance data when correspondence avoidance criteria is no longer satisfied;
   d) acquiring and registering with the selected wireless communications system when the selected wireless communications system is determined to be a useable wireless communications system; and
   e) repeating the step of selecting, before attempting to acquire and register with the selected wireless communications system, when the selected wireless communications system is determined to be an unusable wireless communications system,
   wherein said system identifier for the selected wireless communications system includes a SID/NID pair that uniquely identifies a wireless communications system that matches a system identifier in the list of unusable wireless communications systems to determine when avoidance criterion corresponding to the system identifier in the list of unusable wireless communications systems is satisfied.

2. The method of claim 1 wherein each system identifier identifies at least one wireless communications system.

3. The method of claim 2 wherein each system identifier includes a frequency.

4. The method of claim 1 wherein the step of maintaining comprises the steps of:
   detecting a communications failure with a wireless communications system; and
   adding a new entry to the list of unusable wireless communications systems, the new entry including an identifier of the failed wireless communications system and corresponding avoidance criterion.

5. The method of claim 4 wherein the step of maintaining further comprises the steps of:
assigning an avoidance duration to the detected communications failure; and
calculating an avoidance time before which the failed wireless communications system is unusable, wherein the avoidance criterion includes the avoidance time.

6. The method of claim 5 wherein the avoidance criterion is satisfied if the stored avoidance time is greater than the current time.

7. The method of claim 5 wherein the step of assigning an avoidance duration comprises the steps of:
maintaining a list of detectable communications failures, each detectable communications failure having a corresponding avoidance duration;
locating the detected communications failure in the list of communications failures; and
using the corresponding avoidance duration in the step of calculating.

8. The method of claim 4 wherein the step of detecting includes the step of detecting failed attempts to acquire and register with the selected wireless communications system.

9. The method of claim 1 wherein the steps of selecting and attempting are repeated until the mobile station successfully acquires and registers with the selected wireless communications system.

10. The method of claim 1 wherein the wireless communications systems are selected from the preferred systems list in a predetermined order of desirability.

11. In a mobile station, a method for marking wireless communications systems as unusable wireless communications systems, comprising the steps of:
maintaining a list of unusable wireless communications systems, each entry of a wireless communications system in the list of unusable wireless communications systems including a system identifier and corresponding avoidance criterion that is equal to a current time plus an avoidance duration time from a look-up table that includes an entry for each of a plurality of communications failures and corresponding avoidance durations for not using the wireless communications system;
selecting a wireless communications system from a preferred roaming list;
detecting a communications failure associated with a wireless communications system selected from the preferred roaming list; and
adding a record to the list of unusable wireless communications systems, the added record including an identifier of the wireless communications system selected from the preferred roaming list system and corresponding avoidance criterion based on the detected communications failure, wherein the wireless communications system is selected from the preferred roaming list but is unusable while the corresponding avoidance criterion is satisfied, which is determined before attempting to acquire and register with the selected wireless communications system.

12. The method of claim 11 wherein each system identifier is associated with at least one wireless communications system.

13. The method of claim 11 wherein the step of adding comprises the steps of:
assigning an avoidance duration to the detected communications failure;
calculating an avoidance time before which the failed wireless communications system is unusable, and
storing the avoidance time as the corresponding avoidance criterion.

14. The method of claim 13 wherein the step of assigning an avoidance duration comprises the step of:
maintaining a list of communications failures, each communications failure having a corresponding avoidance duration;
locating the detected communications failure in the list of communications failures; and
using the corresponding avoidance duration in the step of calculating.

15. The method of claim 14 wherein at least two avoidance durations stored in the list of communications failures have different values.

16. A mobile station comprising:
a memory storing a preferred roaming list of wireless communications systems, the preferred roaming list including a first plurality of system identifiers and corresponding acquisition parameters for corresponding wireless communications systems; and
processing circuitry adapted to create and maintain a list of unusable wireless communications systems, the list of unusable wireless communications systems being stored in the memory and including a second plurality of system identifiers and corresponding avoidance criterion for not using corresponding unusable wireless communications systems, wherein at least one of said unusable wireless communications systems is included on the preferred roaming list,
wherein a selected wireless communications system from the preferred roaming list is determined to be an unusable wireless communications system, before attempting to acquire and register with the selected wireless communications system, when a system identifier for the selected wireless communications system matches a system identifier in the list of unusable wireless communications systems and when avoidance criterion that is equal to a current time plus an avoidance duration time corresponding to the system identifier in the list of unusable wireless communications systems is satisfied; said processing circuitry being further adapted to add systems to system avoidance data in response to a communications failure, and remove systems from the system avoidance data when corresponding avoidance criteria is no longer satisfied.

17. The mobile station of claim 16 wherein the processing circuitry comprises:
a system determination unit adapted to select wireless communications systems from the preferred roaming list in accordance with a predetermined system acquisition procedure and attempt to acquire selected wireless communications systems that are usable.

18. The mobile station of claim 17 wherein the processing circuitry is further adapted to detect communications failures with selected wireless communications systems, and add an entry to the list of unusable wireless communications systems in response to a detected communications failure, the entry including a system identifier for the selected wireless communications system and an avoidance time, the avoidance time indicating a duration during which the selected wireless communications system is unusable.

19. The mobile station of claim 18 further including a clock, wherein the memory further includes a list of communications failures, each communications failure having a corresponding avoidance duration, and wherein the avoidance time equals a current time as measured by the clock plus the avoidance duration for the corresponding communications failure.

20. The mobile station of claim 19 wherein the processing circuitry is further adapted to delete an entry from the list of unusable wireless communications systems when the corresponding avoidance time is less than the current time.

21. Processing circuitry in a wireless device adapted to:
create and maintains a list of unusable wireless communications systems stored in a memory, each entry of a wireless communications system in the list of unusable wireless communications systems including avoidance criterion that is equal to a current time plus an avoidance duration time for not using the wireless communications system, wherein at least one of said unusable wireless communications systems is included on the preferred roaming list;
select a wireless communications system from a preferred roaming list of wireless communications systems;
determine whether the selected wireless communications system from the preferred roaming list is a usable wireless communications system or an unusable wireless communications system, wherein the selected wireless communications system is determined to be un unusable wireless communications system, before attempting to acquire and register with the selected wireless communications system, when the selected wireless communications system is included in the list of unusable wireless communications systems and when the corresponding avoidance criterion is satisfied; and
attempt to acquire and register with the selected wireless communications system when the selected wireless communications system is determined to be a useable wireless communications system.

22. The processing circuitry of claim 21, further for storing instructions operable to:
detect a communications failure with a wireless communications system; and
add a new entry for the failed wireless communications system to the list of unusable wireless communications systems, the new entry including avoidance criterion for the failed wireless communications system.

23. The processing circuitry of claim 22, further storing instructions operable to:
assign an avoidance duration to the detected communications failure; and
calculate an avoidance time before which the failed wireless communications system is unusable, wherein the avoidance criterion includes the avoidance time.

* * * * *